United States Patent [19]
Williams et al.

[11] Patent Number: 4,806,936
[45] Date of Patent: Feb. 21, 1989

[54] METHOD OF DETERMINING THE POSITION OF MULTIPLE TARGETS USING BEARING-ONLY SENSORS

[75] Inventors: Patrick R. Williams, Costa Mesa; Henry A. Heidary, Anaheim, both of Calif.

[73] Assignee: Hughes Aircraft Company, Los Angeles, Calif.

[21] Appl. No.: 876,948

[22] Filed: Jun. 20, 1986

[51] Int. Cl.⁴ ............................................. G01S 13/06
[52] U.S. Cl. .................................... 342/126; 342/451; 342/463
[58] Field of Search ............... 342/126, 450, 451, 465, 342/463

[56] References Cited

U.S. PATENT DOCUMENTS

| 2,470,787 | 5/1949 | Nosker | 342/126 X |
| 3,184,739 | 5/1965 | Franklin et al. | 342/126 X |
| 3,248,734 | 4/1966 | Weiss et al. | 342/126 X |
| 3,445,847 | 5/1969 | Hammack | 342/126 X |
| 3,531,801 | 9/1970 | Huebscher | 342/126 X |
| 3,564,543 | 2/1971 | Nehama et al. | 342/126 X |

OTHER PUBLICATIONS

Patrick R. Williams, Multiple Target Estimation Using Multiple Bearing-Only Sensors, Jun. 2-5, 1986.
Charles Morefield, Application O-1 Integer Programming to Multitarget Tracking Problems, Jun. 1977, IEEE Transactions on Automatic Control, vol. cont.. . AC-22 No. 3.
Yaakov Bar-Shalom, Tracking Methods in a Multitarget Environment, Aug. 1978, IEEE Transactions on Automatic Control, vol. AC-23, No. 4.
Charles L. Morefield, Interim Report on Multitarget Tracking Using Multiple Acoustic Sensors, Jun. 1976, Chlares L. Morefield, Multitarget Tracking for Sase, Dec. 1987, vols. I and II.

Primary Examiner—N. Moskowitz
Assistant Examiner—John B. Sotomayor
Attorney, Agent, or Firm—A. W. Karambelas

[57] ABSTRACT

The positions of a plurality of targets (26) are located using three or more sensors (20, 22, 24) such as radars which sense only the bearing angle of the targets. The intersecting bearing lines (30) form triangles (28) representing both true targets (26) and false targets (28). The false target triangles (28) are separated from the true target triangles by analyzing the size and position of each triangle. Bearing data defining the triangles is first ordered and then sequentially examined in a manner such that a first group of false targets (28) is eliminated from consideration. The bearing data defining the remaining triangles is processed through coarse and fine gates to eliminate second and third groups of false targets (28). A fourth group of false targets (28) is eliminated by using a global maximum likelihood procedure, in which a likelihood function is maximized through the use of discrete optimization techniques.

16 Claims, 7 Drawing Sheets

$$\text{RESIDUAL} = \frac{\Delta_1^2}{\sigma_1^2} + \frac{\Delta_2^2}{\sigma_2^2} + \frac{\Delta_3^2}{\sigma_3^2}$$

METHOD OF DETERMINING THE POSITION OF MULTIPLE TARGETS USING BEARING-ONLY SENSORS

TECHNICAL FIELD

The present invention broadly relates to systems for determining and tracking the positions of a plurality of targets, such as aircraft, and deals more particularly with a method for determining the target positions using sensors such as jammed radars which are capable of providing only bearing information.

BACKGROUND OF THE INVENTION

Various types of systems are well known for determining and tracking the positions of a plurality of spatially distributed remote objects or targets. One typical application of such systems is in tracking aircraft which may be considered "targets" in a warfare environment. The problem of tracking target aircraft is complicated by modern electronic counter measures (ECM) in which the aircraft have the ability to jam radars via broadband noise jamming. As a result of jamming, the radar is denied range information, thus rendering a single radar useless for tracking the target.

Others in the past have employed passive tracking techniques using networks of sensors such as sonar and radar. However, in each case, the system assumes that additional information is available, such as the frequency of the emissions, which is used in the tracking process. The additional information is used for the correlation of data received by the different sensors as a discriminant of distinct targets. This approach is undesirable in that it results in higher loads on communication links and more complicated signal processing. Moreover, the performance of such systems will be degraded as more sophisticated emitters are developed from which the sensors cannot discriminate one emitter from another.

There are two primary problems associated with position estimation of multiple targets using multiple sensors. The first is the inaccuracy of sensor measurements and the second is the uncertainty of the origin of those measurements. These problems are particularly acute with angle (bearing-only) sensors (such as jammed radar or infrared sensors) where the measurement consists of the angle (azimuth and possibly elevation) from the target to the sensor. Thus, a single sensor cannot provide complete spatial information about the target but can only determine that the target lies on a line-of-bearing. With the additional measurements from a second sensor, the location of the target can be determined as the intersection of the two lines of bearing. However, in a multiple target environment, multiple lines of bearings will be detected at both sensors. Bearing lines will cross and intersections are formed at points where targets do not actually exist. These points of intersections are sometimes referred to as "ghosts". To illustrate the severity of the problem, if ten targets are observed at both sensors, up to 100 intersections can be formed so that up to 90 ghosts appear. If the sensors have no other information available, no further discrimination of targets from ghosts can be made.

The present invention involves, in part, recognition of the fact that the use of a third sensor will help resolve the target ambiguities, since the targets will be located at the intersections of three lines of bearing. However, ghosts could still occur with three sensors, though this is unlikely if the sensor measurements are perfect. In reality, however, sensor measurement inaccuracies are experienced and the three lines of bearing corresponding to a true target will not intersect at a single point, but rather will define a triangular region. For many target scenarios, there may be many triangular regions; some of these regions correspond to true targets but many correspond to ghosts. The apparent target positions can be estimated using standard statistical techniques and any three lines of bearing, yet it will not be known whether a true target or a ghost is present.

The present invention discloses a method for resolving the ambiguities mentioned above so that true targets can be distinguished from ghosts.

SUMMARY OF THE INVENTION

According to the present invention, a method is provided for determining the positions of multiple targets using a network of bearing-only sensors. The intersecting bearing lines between the sensors and the true targets form triangles representing both true and false targets. The method is based, in part, on a statistical maximum likelihood estimation technique which does not verify a target detection until all triangles have been examined. Many of the candidate targets are determined to be statistically unlikely and are eliminated through a two-stage filtering process consisting of a coarse gate and a fine gate. An optimization technique is used to process the remaining candidates, in which an "optimal" assignment of the estimated targets from the collection of likely candidate targets is made; this is accomplished by imposing the constraint that a single bearing line (strobe) cannot contribute to the estimation of more than one estimated target position.

Accordingly, it is a primary object of the present invention to provide a method of determining the positions of multiple targets using bearing-only sensors which is relatively simple and does not require a substantial amount of hardware.

Another object of the invention is to provide a method as described above which is not subject to defeat by jamming techniques or similar electronic countermeasures.

A still further object of the invention is to provide a method as described above which is highly accurate in distinguishing ghosts from true targets.

These, and further objects of the invention will be made clear or will become apparent during the course of the following description of a preferred embodiment of the present invention.

DESCRIPTION OF THE PREFERRED EMBODIMENTS

Figure 1:
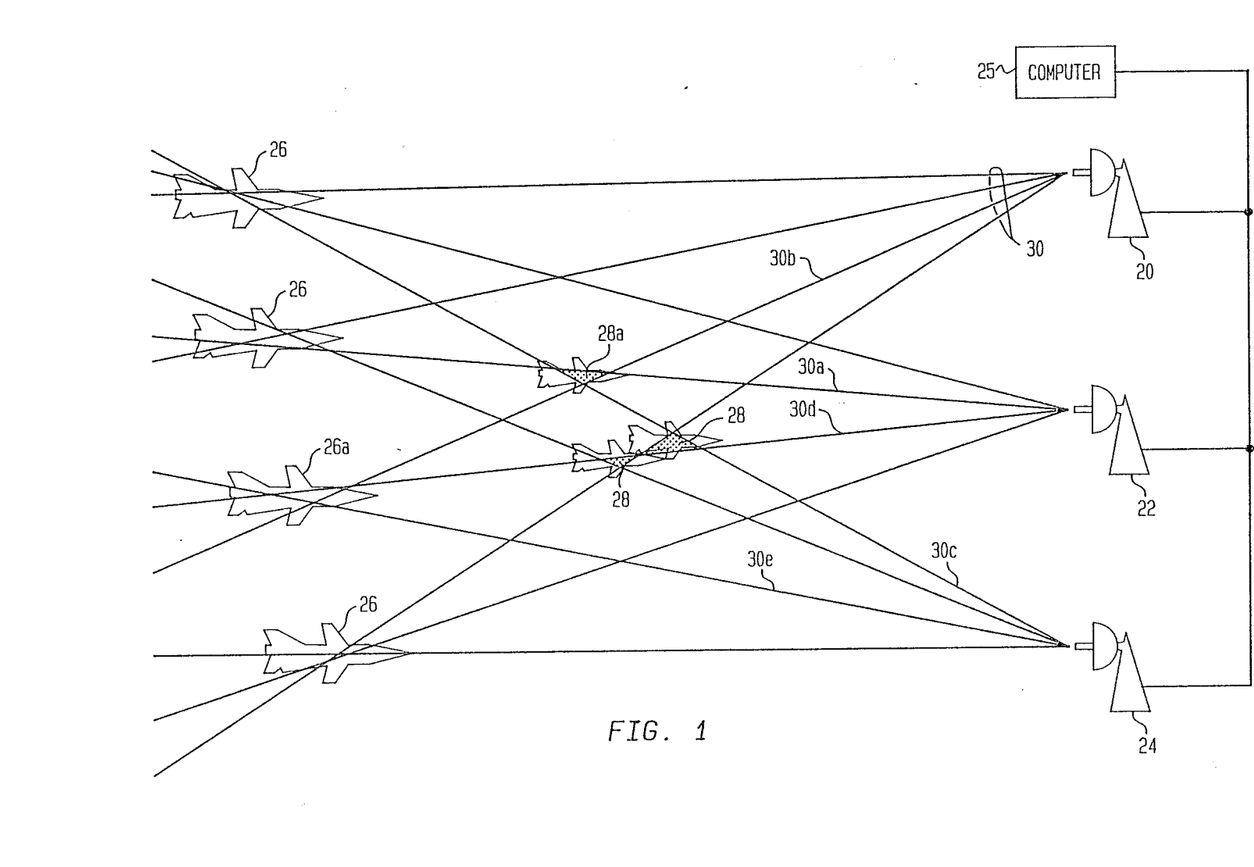
FIG. 1 is a diagrammatic view depicting a network of bearing-only sensors for determining the positions of multiple targets, in which the bearing lines form triangular areas representing true targets and ghosts.

Referring first to FIG. 1, the present invention broadly involves a method for determining the positions of multiple targets 26 using a plurality or network of bearing-only sensors, such as the radars 20, 22 and 24 which may be communicatively coupled with a suitable computer 25 such as VAX/11-780 manufactured by the Digital Equipment Corporation. The method is applicable to most netted passive surveillance systems such as sonar, infrared, light and jammed radar in which a traveling wave is delivered from a target to a surveillance point. It is to be understood that the term "target" as used herein refers to any type of object whose position is to be determined.

The targets 26 generate signals which are detected by each of the radars 20-24 and these detected signals will be referred to herein as "strobes" 30 or bearing lines, i.e. the strobes 30 represent the bearing between the target 26 and the corresponding radar sensing location 20-24. Each target 26 is located at a position where one bearing line 30 from each of the radars 20-24 intersect at a point. For example, bearing lines 30b, 30d and 30e intersect at target 26a. However, the bearing lines 30 also generally intersect at other points and form triangles 28 which are "ghosts", i.e. false targets. For example, a ghost 28a is formed by bearing lines 30a, 30b and 30c.

The bearing lines 30 do not precisely intersect at a point at either the true target or false target locations due to measurement inaccuracies, but rather form the triangular areas 28. The positions of these triangular areas can be simply determined by conventional triangulation techniques, however, it is not known whether a triangular area represents a target 26 or a ghost 28. The present invention permits determination of the ghosts 28 so that the remaining triangles are representative of the locations of the true targets 26, thus allowing the positions of the targets 26 to be calculated.

Figure 2:
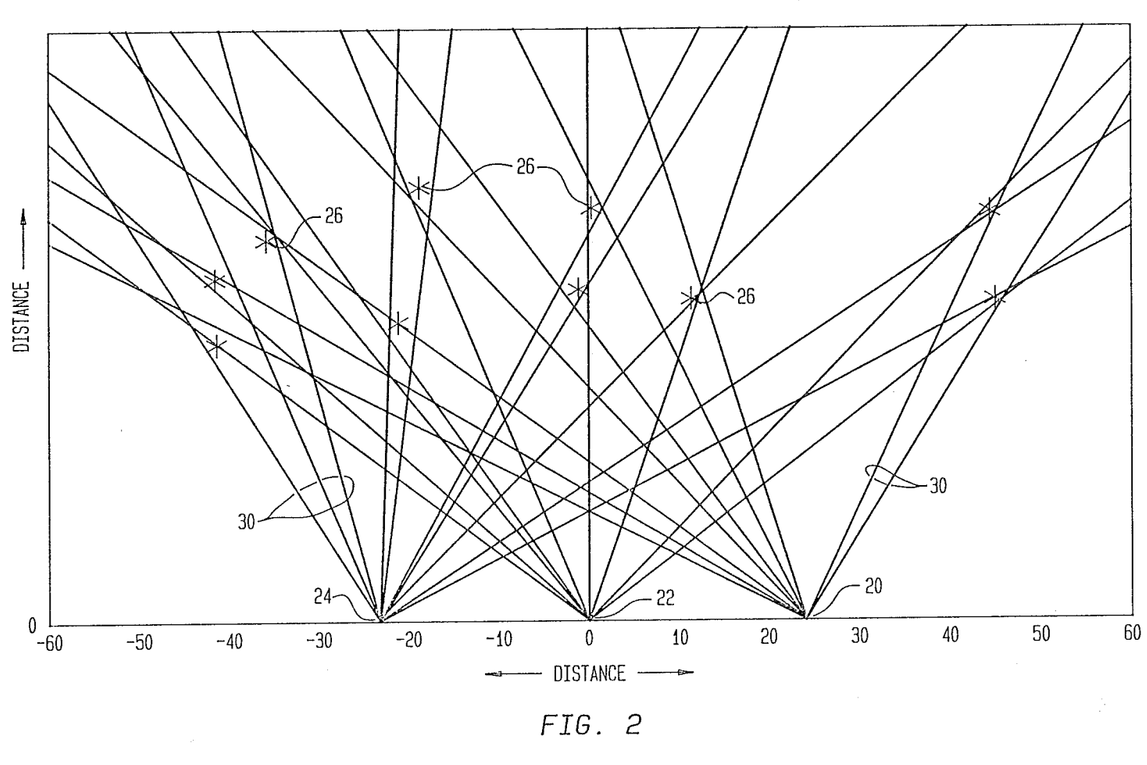
FIG. 2 is a graph showing the bearing lines between three sensors and multiple, true targets.

As shown in FIG. 2, the radars 20-24 are generally aligned with each other and are spaced apart a sufficient distance so as to have a collective field of view wide enough to encompass the targets 26 to be depicted. Each of the targets 26 results in the generation of a strobe or bearing line 30 for each of the radars 20-24.

An overview of the method will now be given, following which each of the steps of the method will be described in detail. The present method is based on a statistical maximum likelihood estimation technique which does not confirm the detection of a target until all triangles or "triples" has been examined. Thus, if there are ten targets 26 detected by the three radars 20-24, there are 1,000 possible triples or candidate target positions to be examined. Many of these candidate targets can be determined to be statistically unlikely and the inventive method eliminates these unlikely triples through a two-stage filtering process consisting of a coarse grating and a fine grating. With the remaining candidate targets, a mathematical optimization technique is used which makes an "optimal" assignment of the estimated targets from the collection of likely candidate targets, and this will be hereinafter referred to as "global optimization". Global optimization is accomplished by imposing the constraint that a single strobe 30 cannot contribute to the estimation of more than one estimated target position.

Figure 3:
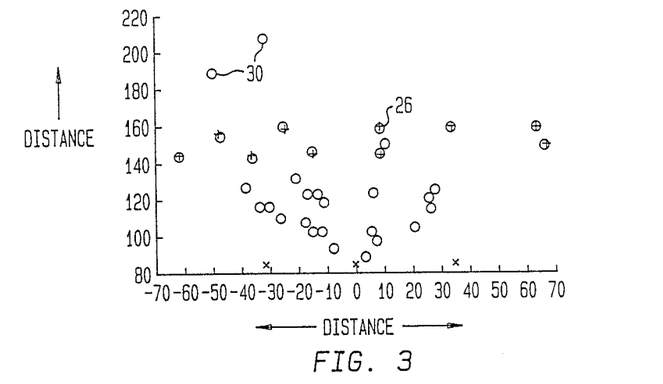
FIG. 3 is a graph depicting the locations of true and false targets after processing by the coarse gate.

The strobes are first ordered and then are sequentially examined so that a number of unlikely triangles or ghosts 28 are eliminated. The remaining strobes are then examined which form the triangular intersections. The coarse gate consists of determining whether the triangle formed is "small enough". All triangles which are too large are eliminated by the coarse gate and the next step is then performed which consists of imposing a fine gate. FIG. 3 depicts the results after processing all of the triangles through the coarse gate. Based on an assumption of ten targets, it can be seen that the 1,000 possible triples or candidate targets has been reduced to approximately 33.

Following the coarse gate, a fine gate is applied to the remaining candidate target positions. Processing with the fine gate consists of eliminating a target position using the triples which passed the coarse gate and computing a residual value which is a measure of the difference between the measured strobes which form the triple and the predicted strobes formed from the estimated target position. If this residual figure-of-merit is too large, the triple is eliminated from further consideration, i.e. it fails the fine gate. The result of using the fine gate filter is shown in FIG. 4, wherein the total number of target positions has been reduced to 24.

Figure 4:
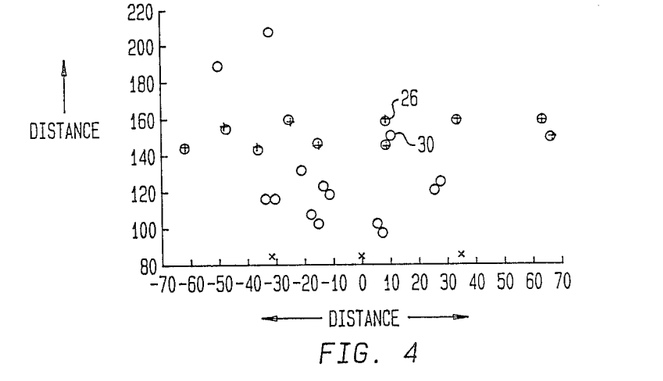
FIG. 4 is a graph similar to FIG. 3 but depicting processing after the fine gate.
Figure 5:
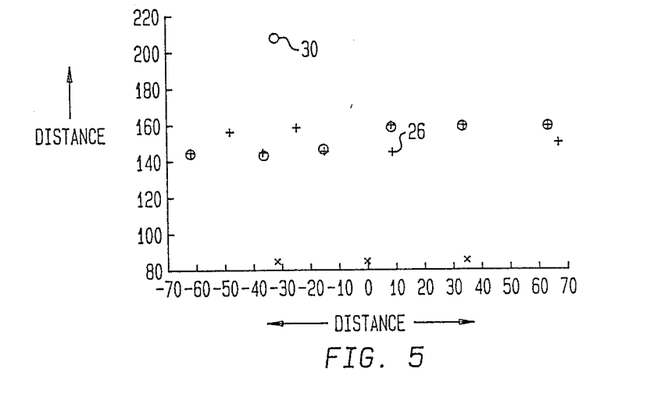
FIG. 5 is a view similar to FIGS. 3 and 4, but after the global optimization has been performed.

However, as shown in FIG. 4, there are still too many "ghosts" remaining and further discrimination of true targets 26 from ghosts 28 is required. The reason that a relatively high number of ghosts 28 remain relative to the number of true targets 26 is that each strobe 30 is used more than once to form multiple triangles. In other words, a single strobe is often used in the estimation of many candidate target positions which pass the fine gate. In order to eliminate these remaining ghosts, targets are chosen which provide a minimum sum of residuals subject to the constraint that no two estimated targets share a strobe. This selection process can be placed in the context of a particular zero-one integer programming problem known as set packing. A solution to the set packing can be found by implementing an algorithm devised by John Pierce. See J. F. Pierce, "Application of Combinatorial Programming to a Class of All-Zero-One Integer Programming Problems", Management Science, Vol. 15, pp. 191-209, November 1968, and also Pierce and Lasky, "Improved Combinatorial Programming Algorithms for a Class of All-Zero-One Integer Programming Problems", Management Science, Volume 19, pp. 528-543, January 1973. Typical results of the "global optimization process" described immediately above are shown in FIG. 5.

Figure 6:
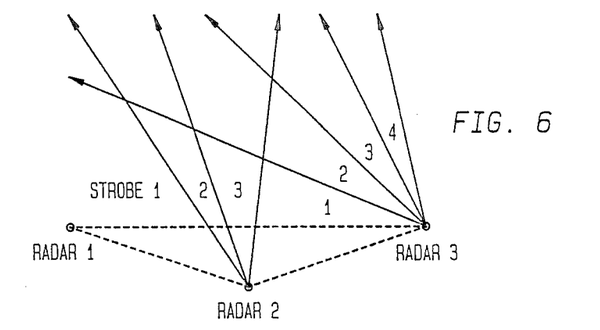
FIG. 6 is a diagrammatic view of selected bearing lines showing the manner in which the bearing lines are ordered.

Having provided the above overview, a more detailed description will now be given for each step involved in the method. The first step involved in the method consists of ordering the strobe data, i.e. assigning an order to the strobes 30 associated with each radar 20-24. This ordering scheme is shown in FIG. 6. For purposes of the remaining portion of this disclosure, the radars will be designated as radar 1, radar 2, radar 3, and the bearing lines 30 will be designated as strobes 1, 2, 3, etc. for each of the radars. As mentioned above, before determining the most likely triple intersections which indicate a true target, all possible triples must be examined. After the first step of ordering the strobes for the radars, the strobes for radar 1 are sequentially chosen. For each strobe from radar 1, all of the strobes of radar 2 are searched. Finally, for each chosen pair of strobes from radars 1 and 2, all of the strobes for the third radar are searched to form triple intersections. However, by careful ordering of the strobe data as mentioned above, many of these triples are eliminated on the basis of previous triple's calculations, thereby resulting in a more efficient search. The first ordering determines the order of selection of the strobes from among the three radars. Since very strobe from the first radar will be examined, it is sufficient to designate radar 1 as the radar with the fewest strobes. Radar 2 can then be designated as the radar having the next fewest strobes, and finally, the radar with the most strobes is designated as radar 3. Next, the strobes from radar 2 are ordered, following which the strobes from radar 3 are ordered; in each case, the strobes are ordered so that they "fan out"0 away from radar 1.

Figure 7:
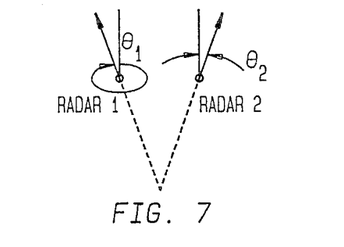
FIG. 7 is a diagrammatic view of bearing lines which are incompatible with each other.
Figure 8:
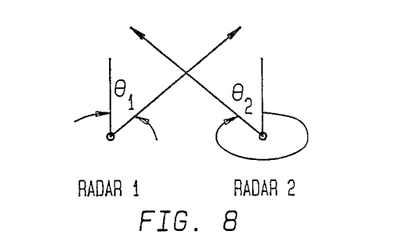
FIG. 8 is a diagrammatic view depicting two compatible bearing lines.
Figure 13:
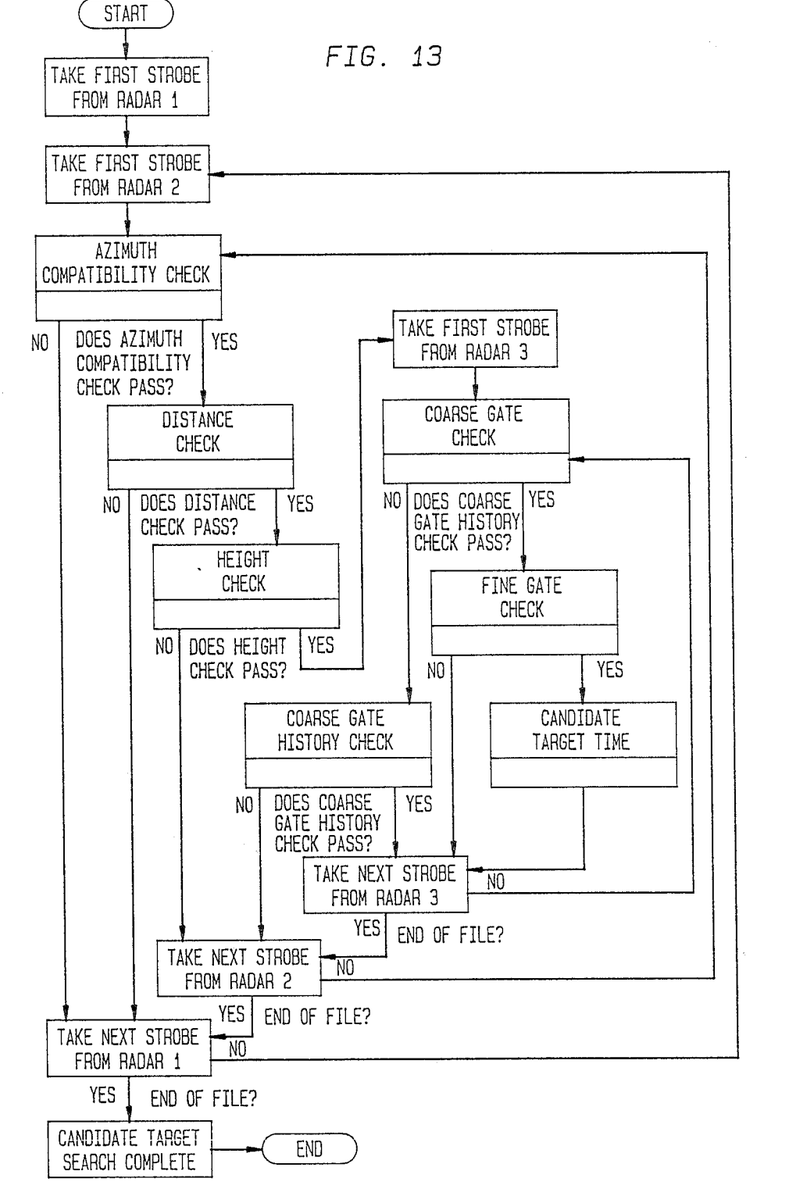
FIG. 13 is a logic flow diagram for a method of determining target candidates; and, FIG. 14 is a diagrammatic view of three intersecting bearing lines and showing the designations of vertices and angles used in estimating the target position.

The next step in the method involves processing the triples through a coarse gate. This examination procedure, which is depicted in the logic flow diagram of FIG. 13, is conducted as follows. The first strobe from radar 1 is selected. The strobes from radar 2 are then sequentially chosen and their compatibility with the first selected strobe from radar 1 is checked. In fact, two checks are performed: an azimuth compatibility check and a distance check. The azimuth compatibility check determines whether the strobes from the radars will intersect within the field of view of the radars by comparing the azimuth angles $\theta_1$, $\theta_2$ from radars 1 and 2 respectively. For example, incompatible strobes from radars 1 and 2 are shown in FIG. 7 while compatible strobes are shown in FIG. 8. The distance check determines whether the distance of the intersection point to either of the radars is beyond a preselected value, i.e. too far. If either of these checks fails, the strobe pairing is declared incompatible and is excluded from consideration in forming a triple intersection. Because of the ordering of strobes from radar 2, if one pairing is compatible, all remaining strobes of the order from radar 2 will be incompatible with the strobe from radar 1 and therefore need not be checked. Thus, the search scheme skips the remaining strobes from radar 2 and selects the next strobe from radar 1. If, however, the pair is compatible, it is stored and the next strobe from radar 2 is selected and checked for compatibility.

Figure 9:
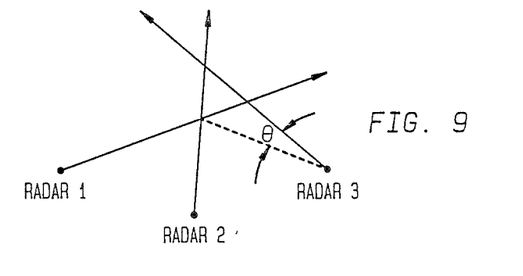
FIG. 9 is a diagrammatic view of three bearing lines and the technique used to impose a coarse gate.

For each pair of strobes from radar 1 and 2 which are declared compatible using the foregoing method, a height check is performed (if an elevation measurement is available from the sensor) and for all strobe pairs which pass the height check, a search is made for compatible strobes from radar 3 by sequentially choosing strobes from the third radar. A coarse gate check is performed which thresholds on the difference between the predicted azimuth and the measured azimuth to radar 3. The predicted azimuth is the azimuth angle from the intersection point of the strobe pair selected from radars 1 and 2, and the measured azimuth is the actual measured azimuth as reported in the selected strobe from radar 3. The difference between the measured and predicted azimuth is designated by the azimuth angle theta $\theta$ in FIG. 9. If this angle difference is beyond a preselected value, the triple thus formed is declared ineligible and is therefore excluded from further consideration. As in the preceding case, if the triple is declared to be incompatible, the remaining strobes from radar 3 will also be incompatible. When this check fails, the search scheme skips the remaining strobes from radar 3 and another strobe pair from radars 1 and 2 is selected. All triples which pass this coarse gate are then processed through the fine gate described below.

Figure 10:
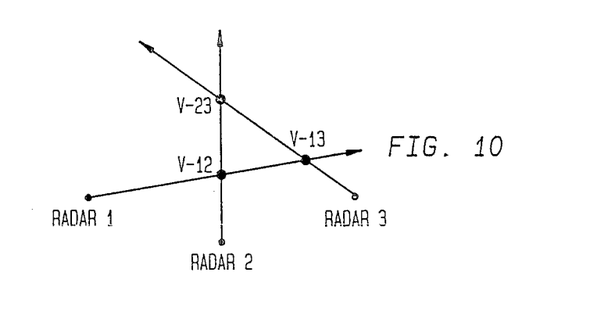
FIG. 10 is a diagrammatic view of three intersecting bearing lines showing the estimate of a target position using the vertices of the triangle.
Figure 14:
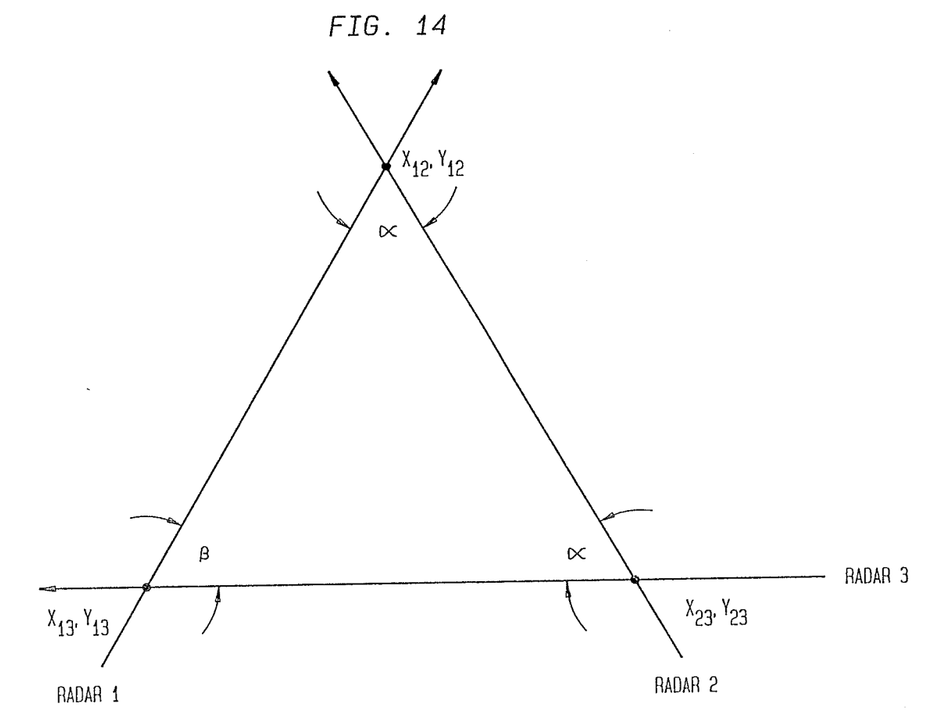

All triple intersections which pass the coarse gate are used to estimate a target position (XT, YT) as part of the fine gate processing. Each triple defines a triangular region as depicted in Figure 10. Referring to FIG. 14, the estimate of a target position is computed as a weighted sum of the vertices of the triangle as:

$$XT = \frac{\sin^2\alpha X_{12} + \sin^2\beta X_{13} + \sin^2\gamma X_{23}}{\sin^2\alpha + \sin^2\beta + \sin^2\gamma}$$

and, $$YT = \frac{\sin^2\alpha Y_{12} + \sin^2\beta Y_{13} + \sin^2\gamma Y_{23}}{\sin^2\alpha + \sin^2\beta + \sin^2\gamma}$$

Figure 11:
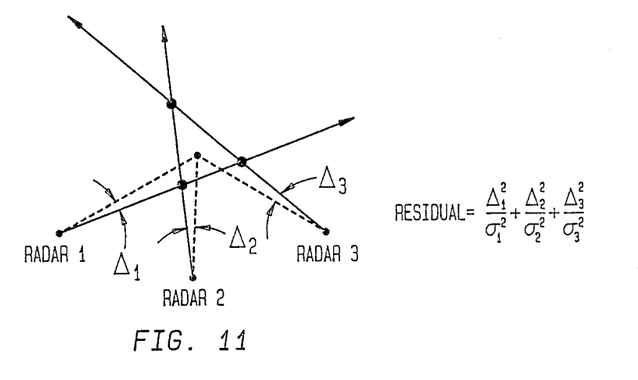
FIG. 11 is a diagrammatic view of three interesting bearing lines and showing the calculation of a residual figure of merit which is used in the fine gate.

After estimating a target position, a residual figure-of-merit is computed as the sum of the squares of the difference between the predicted (estimated) azimuths and elevations and the measured strobes. These differences are indicated in FIG. 11 and are designated $\Delta_1$, $\Delta_2$, $\Delta_3$. Each of the squares of these differences is divided by the square of the azimuth error variance $\sigma$ of the radar source, the formula for the residual figure-of-merit being depicted in FIG. 11. The residual figure-of-merit is compared with threshold values to eliminate unlikely target positions, i.e. the remaining triangles are processed through a fine gate. The target positions which pass the fine gate are denoted as candidate target positions and are stored for use in the global optimization step described below. The residual values computed in the fine gate procedure are also used in the global optimization process for picking the "optimal" set of targets.

Figure 12:
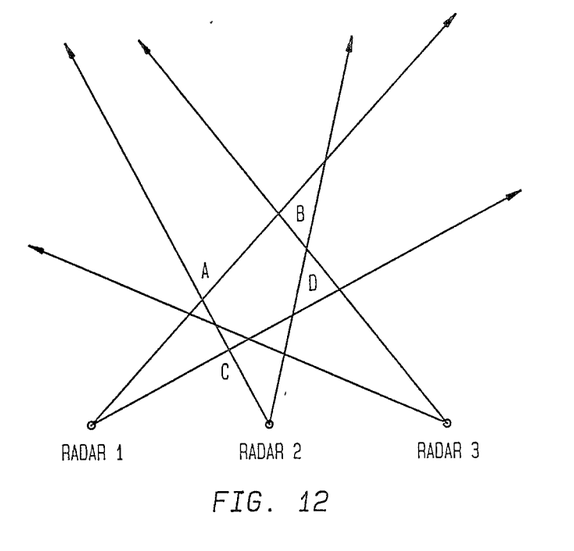
FIG. 12 is a diagrammatic view of six interesting bearing lines showing two potential solutions of candidate targets.

The fine gate process provides a set of candidate target positions which correspond to both true targets and some ghosts. Out of this set, a subset of targets will be called a (global) potential solution if it is in fact a subset. If a strobe was used to estimate one candidate target position, it cannot be used to estimate another candidate target in that potential solution. Two potential solutions are illustrated in FIG. 12; the first solution consists of candidate targets A and D, and the second solution consists of targets B and C.

The final result of the method of the present invention is the potential solution which possesses the maximum "likelihood" of all potential solutions where likelihood of a potential solution is defined as follows:

$$\text{LIKELIHOOD} = \underset{\text{all } ijk}{\Sigma\Sigma\Sigma} (\text{CONST} - \text{RESIDUAL}_{ijk})X_{ijk}$$

where CONST = a constant larger than any residual for the candidate targets.

and RESIDUAL$_{ijk}$ = the residual figure-of-merit computed for candidate target $ijk$.

The global optimization problem is now formulated mathematically as: determine the solution, ($X_{ijk}$), which maximizes the likelihood function (LIKELIHOOD) while also satisfying the following set of inequalities or constraints:

$$\sum_{jk} \Sigma X_{ijk} \leq 1 \quad \text{for all } i$$

$$\sum_{ik} \Sigma X_{ijk} \leq 1 \quad \text{for all } j$$

$$\sum_{ij} \Sigma X_{ijk} \leq 1 \quad \text{for all } k$$

where each $X_{ijk} = 0$ or 1.

Each variable $X_{ijk}$ represents a triple intersection formed using the $i^{th}$ strobe from radar 1, the $j^{th}$ strobe from radar 2, and $k^{th}$ strobe from radar 3 where i, j and k are integers. The variables which satisfy $X_{ijk} = 1$ correspond to the triples which make up a potential solution. The estimated targets are then the candidate targets (i, j, k) for which $X_{ijk} = 1$.

This maximization problem is called a set packing problem in the field of mathematical optimization. It is a particular form of the zero-one programming problem for which there has been considerable research in the development of efficient methods for solution. One approach for solving this problem is the Pierce algorithm mentioned above. The algorithm does not actually solve the set packing problem but instead solves the related set partitioning problem. The set partitioning problem can be described as the set packing problem but is a minimization as opposed to a maximization problem and has equality constraints as opposed to less-than constraints. The set packing problem is transformed by appending "slack" variables which transform the less-than constraints to equality constraints and then modifying the likelihood function which is to be maximized. These are standard transformations used in integer programming problems and can be found in readily available integer programming textbooks.

The problem can be simplified by limiting its size. Both variables and constraints can be eliminated, thus speeding up the Pierce algorithm as follows: The variables, $X_{ijk}$, can be eliminated whenever a triple (i, j, k) does not correspond to a candidate target (pass the fine gate). A constraint can be eliminated whenever it is dominated by another constraint. One constraint dominates another whenever the first constraint is satisfied implies that the second is satisfied. After simplifying the problem, Pierce's algorithm is applied.

Having thus described the invention, it is recognized that those skilled in the art may make various modifications or additions to the preferred embodiment chosen to illustrate the invention without departing from the spirit and scope of the present contribution to the art. Accordingly, it is to be understood that the protection sought and to be afforded hereby should be deemed to extend to the subject matter claimed and all equivalents thereof fairly within the scope of the invention.

What is claimed is:

1. A method of determining the positions of a plurality of targets using only the bearings of the targets and in which true targets are distinguished from false targets, comprising the steps of:
   (A) viewing the targets with at least three bearing sensors, each of the sensors receiving a strobe from a true target along a line indicating the bearing of the true target, the bearing lines intersecting to form triangles indicating the positions of the true targets and of the false targets;
   (B) comparing the size and position of each of the triangles with preselected values to distinguish one set of triangles indicating true targets from another set of triangles indicating false targets including eliminating by integer programming those triangles in excess of one which lie along a single bearing line; and
   (C) calculating the positions of said one set of triangles using the bearing lines which define the triangles in said one set.

2. The method of claim 1, wherein step (B) includes the step of examining the bearing lines in a preselected order such that only bearing lines which form said triangles are examined.

3. A method of determining the spatial positions of each of a plurality of spaced apart objects to a reference point, comprising the steps of:
   (A) receiving traveling wave signals from each of the objects at first, second and third spaced apart sensors and along lines defining the bearings of said objects relative to said sensors, the bearing lines from each object intersecting near the object forming a triangle which defines the true position of said object and intersecting to form one or more additional triangles distal the object which define false positions of objects;
   (B) determining the size of each triangle formed by the intersecting bearing lines, the size of the triangles which define false targets being greater than a prescribed value; and
   (C) eliminating as potential true object positions all of those triangles which are greater in size than said prescribed value.

4. The method of claim 3, wherein step (B) is performed by:
   successively selecting bearing lines to said first sensor,
   sequentially comparing the compatibility of each selected bearing line to said first sensor with each of the bearing lines to said second sensor to form compatible pairs of bearing lines to said first and second sensors, and
   sequentially comparing the compatibility of each of the compatible pairs of bearing lines with each of the bearing lines to said third sensor.

5. The method of claim 4, wherein step (B) is further performed by:
   determining a first azimuth to said third sensor of the intersection of each compatible pair of bearing lines to said first and second sensors,
   determining a second azimuth to said third sensor of a bearing line from a triangle to said third sensor, and
   comparing said first and second azimuths.

6. The method of claim 3, including the steps of:

assigning an examination order to each of the bearing lines, and comparing the bearing lines of said sensors in accordance with the assigned order.

7. The method of claim 3, including the step of:
(D) estimating the positions of the triangles remaining after completing step (C).

8. The method of claim 7, wherein the positions estimated in step (D) are computed as a weighted sum of the vertices of the triangle, the weights being a function of the shape of the triangle, the error in sensor measurement and the range of the triangle to the sensor.

9. The method of claim 7, including the steps of:
(E) computing a residual figure which is the sum of the squares of the difference between the predicted and measured positions of the triangle, and,
(F) comparing the value of the residual figure with a threshold value to eliminate additional triangles corresponding to false object positions.

10. The method of claim 9, wherein any of the bearing lines which are selected for use in estimating the positions of triangles are not subsequently used to estimate the position of another triangle.

11. A method of determining the positions of a plurality of targets using first, second and third spaced apart radars or the like for sensing only the bearings of the targets, comprising the steps of:
(A) receiving at each of said radars a strobe signal from each of the targets along a bearing line between the radar and the target, the bearing lines from said radars intersecting near said targets to define target triangles indicating the true positions of said targets and intersecting more distal from said targets to define ghost triangles indicating false positions of said targets;
(B) determining the size of each of said triangles;
(C) eliminating the triangles which are larger than a prescribed size;
(D) estimating the positions of the triangles remaining after step (C) is completed;
(E) calculating a residual figure by computing the sum of the squares of the difference between the azimuths and elevations of the positions estimated in step (D) and the azimuths and elevations of the bearing lines forming the vertices of said remaining triangles;
(F) comparing said residual figure with a threshold value; and,
(G) eliminating the triangles which have a residual figure greater than said threshold value.

12. The method of claim 11, including the step of eliminating at least a portion of the triangles which are defined by a bearing line that forms more than one triangle.

13. The method of claim 11, wherein step (B) includes the steps of assigning an order to the bearing lines received in step (A) and selecting bearing lines for examination in accordance with the assigned order.

14. The method of claim 13, including the step of eliminating incompatible pairs of bearing lines which are incapable of forming a triangle.

15. The method of claim 11, wherein step (B) is performed by:
comparing sets of the bearing lines to determine whether the bearing lines in each set diverge away from said radars, and
comparing sets of the bearing lines to determine whether the bearing lines in each set intersect at a point which is beyond a preselected distance from said radars.

16. The method of claim 11, wherein step (D) is performed by computing the positions as weighted sums of the vertices of the triangles, the weights being a function of the shape of the triangle, the variance in radar measurement of the bearing lines forming the triangle and the range of the triangle to the radars.

* * * * *